(12) United States Patent
Niemczyk

(10) Patent No.: US 9,783,167 B2
(45) Date of Patent: Oct. 10, 2017

(54) DEVICE FOR CLEANING AN OPTICAL LENS OF A PARKING ASSISTANCE CAMERA

(71) Applicant: Bayerische Motoren Werke Aktiengesellschaft, Munich (DE)

(72) Inventor: Thomas Niemczyk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/216,986

(22) Filed: Jul. 22, 2016

(65) Prior Publication Data

US 2016/0325715 A1 Nov. 10, 2016

Related U.S. Application Data

(63) Continuation of application No. PCT/EP2015/051050, filed on Jan. 21, 2015.

(30) Foreign Application Priority Data

Jan. 24, 2014 (DE) .................. 10 2014 201 327
Feb. 5, 2014 (DE) .................. 10 2014 202 072

(51) Int. Cl.
*B60S 1/56* (2006.01)
*B60S 1/52* (2006.01)
(Continued)

(52) U.S. Cl.
CPC ............... *B60S 1/56* (2013.01); *B60R 11/04* (2013.01); *B60S 1/48* (2013.01); *B60S 1/528* (2013.01); *B60S 1/54* (2013.01); *G02B 27/0006* (2013.01)

(58) Field of Classification Search
CPC .......... G02B 27/0006; B60S 1/46; B60S 1/48; B60S 1/54; B60S 1/56; B60S 1/60; B60S 1/52; B60S 1/00
See application file for complete search history.

(56) References Cited

U.S. PATENT DOCUMENTS

| 6,182,325 B1 | 2/2001 | Herman |
| 6,527,000 B1 | 3/2003 | Randmae et al. |

(Continued)

FOREIGN PATENT DOCUMENTS

| CN | 1299455 A | 6/2001 |
| CN | 101553318 A | 10/2009 |

(Continued)

OTHER PUBLICATIONS

International Search Report (PCT/ISA/210) issued in PCT Application No. PCT/EP2015/051050 dated May 4, 2015, with English translation (four (4) pages).

(Continued)

*Primary Examiner* — David Redding
(74) *Attorney, Agent, or Firm* — Crowell & Moring LLP

(57) ABSTRACT

A device for cleaning an optical lens of a parking assistance camera includes at least one inner annular body and at least one outer annular body. The at least one outer annular body is configured such that the fluid chamber is closed with respect to surroundings of the device when the at least one outer annular body is in the resting position. The at least one outer annular body is configured such that the fluid chamber is open with respect to the surroundings of the device such that when said at least one outer annular body is in the cleaning position, a fluid introduced into the fluid chamber exits the fluid chamber in the direction of the optical lens. The at least one fluid supply element opening into the fluid chamber is disposed on the at least one inner annular body.

9 Claims, 2 Drawing Sheets

(51) Int. Cl.
  *B60R 11/04*   (2006.01)
  *G02B 27/00*   (2006.01)
  *B60S 1/48*    (2006.01)
  *B60S 1/54*    (2006.01)

(56) References Cited

U.S. PATENT DOCUMENTS

| | | |
|---|---|---|
| 2003/0155001 A1 | 8/2003 | Hoetzer et al. |
| 2008/0048048 A1 | 2/2008 | Noestheden |
| 2009/0250533 A1 | 10/2009 | Akiyama et al. |
| 2011/0073142 A1 | 3/2011 | Hattori et al. |
| 2015/0183406 A1 | 7/2015 | Tanaka et al. |

FOREIGN PATENT DOCUMENTS

| | | |
|---|---|---|
| DE | 100 12 004 A1 | 9/2001 |
| DE | 102 25 151 A1 | 12/2003 |
| DE | 2014-19403 A | 2/2014 |
| EP | 1 726 498 A1 | 11/2006 |
| FR | 2 681 031 A1 | 3/1993 |

OTHER PUBLICATIONS

German Search Report issued in counterpart German Application No. 10 2014 202 072.7 dated Sep. 25, 2014, with partial English translation (ten (10) pages).

Chinese Office Action issued in counterpart Chinese Application No. 201580005419.9 dated Apr. 6, 2017 with English translation (eight (8) pages).

US 9,783,167 B2

DEVICE FOR CLEANING AN OPTICAL LENS OF A PARKING ASSISTANCE CAMERA

CROSS REFERENCE TO RELATED APPLICATIONS

This application is a continuation of PCT International Application No. PCT/EP2015/051050, filed Jan. 21, 2015, which claims priority under 35 U.S.C. §119 from German Patent Application No. 10 2014 201 327.5, filed Jan. 24, 2014, and 10 2014 202 072.7, filed Feb. 5, 2014, the entire disclosures of which are herein expressly incorporated by reference.

BACKGROUND AND SUMMARY OF THE INVENTION

The invention relates to a device for cleaning an optical lens of a parking assistance camera disposed on a vehicle.

The invention further relates to a parking assistance system for a vehicle, including at least one parking assistance camera that includes at least one optical lens and is disposed on the vehicle.

Devices for cleaning an optical lens of a parking assistance camera disposed on a vehicle are known from unexamined patent applications DE 100 12 004 A1 and DE 102 25 151 A1, for example.

In contrast to driver assistance cameras that are usually disposed in the interior of a vehicle behind a windshield of the vehicle, parking assistance cameras are directly exposed to outside influences, such as weather conditions. Soiling of an optical lens of a parking assistance camera caused by the outside influences and damage to the optical lens caused by stone chips impair the image quality achievable with a parking assistance camera, which in particular makes automated image processing difficult. A further impairment of the image quality achievable with a parking assistance camera, which is frequently encountered and therefore serious, is water drops present on an optical lens of the parking assistance camera. Installing parking assistance cameras in a location having high air flow so as to remove the water drops present on an optical lens is generally difficult to implement due to design requirements.

It is the object of the invention to enable optimal cleaning of an optical lens of a parking assistance camera disposed on a vehicle, without permanently restricting an angle of view of the optical lens.

This object is achieved by a device for cleaning an optical lens of a parking assistance system, as well as by a parking assistance system having such a device, according to embodiments of the invention.

According to the invention, a device for cleaning an optical lens of a parking assistance camera disposed on a vehicle comprises: at least one inner annular body, which can be disposed on the optical lens so as to be immovable and at least partially surround the optical lens radially on the outside, and on which an annular receptacle that is developed open toward the space in question of the optical lens is disposed; and at least one outer annular body, which is disposed coaxially to the inner annular body and at least partially within the receptacle. The outer annular body is disposed so as to be axially movable relative to the inner annular body between an extended cleaning position and a retracted resting position. The outer annular body is acted upon by a restoring force in the direction of the resting position. At least one fluid chamber is disposed between the inner annular body and the outer annular body. The outer annular body is designed such that the fluid chamber is closed with respect to the surroundings of the device when the outer annular body is in the resting position. The outer annular body is designed such that the fluid chamber is open with respect to the surroundings of the device when the outer annular body is in the cleaning position, so that a fluid introduced into the fluid chamber exits the fluid chamber in the direction of the optical lens. And, at least one fluid supply element opening into the fluid chamber is disposed on the inner annular body.

For cleaning the optical lens, the outer annular body can be axially moved out of the retracted resting position thereof, in which the outer annular body does not impair the angle of view of the optical lens, relative to the inner annular body, against the restoring force acting on the outer annular body in the direction of the retracted resting position thereof, by way of a pressurized fluid acting on the fluid chamber disposed between the inner annular body and the outer annular body, and can thereby be transferred into the extended cleaning position thereof, in which the angle of view of the optical lens, and in particular of an ultra wide angle lens system, may be slightly impaired by the outer annular body. After the fluid chamber has been acted upon by a pressurized fluid, the outer annular body is transferred back into the resting position thereof, in particular automatically, due to the restoring force acting thereon in the direction of the resting position. The overall arrangement composed of the inner annular body and the outer annular body is thus telescoping.

Since the inner annular body is immovably disposed on the optical lens, which is to say is not able to carry out movements relative to the optical lens, it is possible to use the inner annular body as a part of the parking assistance camera, for example as a holder for the optical lens. The inner annular body preferably partially surrounds the optical lens radially on the outside such that the angle of view of the optical lens is not impaired by the inner annular body. The inner annular body may be circular, elliptical, or oval, and in particular it can be adapted to the shape of the optical lens. Depending on the application, a polygonal design of the inner annular body is also possible. Furthermore, the shape of the inner annular body may also deviate from an ideal ring by having a solid material reinforcement within an outer annular section.

The outer annular body disposed coaxially to the inner annular body can partially or completely surround the inner annular body radially on the outside. The dimensions of the two annular bodies can also be identical, at least in the axial direction. The outer annular body can likewise be circular, elliptical, or oval, and in particular it can be adapted to the shape of the inner annular body. Moreover, depending on the application, a polygonal design of the outer annular body is possible.

Applying a restoring force on the outer annular body in the direction of the resting position thereof can take place passively, for example, using mechanical devices, in particular at least one tension or compression spring, or passively or actively using electromagnetic devices.

The space in question of the optical lens shall be understood to mean the space in front of the optical lens in which the angle of view of the optical lens and the field of vision of the optical lens are located.

The outer annular body is designed such that the fluid chamber is closed with respect to the surroundings when the outer annular body is in the resting position thereof, so that no fluid introduced into the fluid chamber can reach the surroundings. The outer annular body may cooperate with the inner annular body for this purpose in the manner of a valve. The outer annular body is furthermore designed such that the fluid chamber is open with respect to the surroundings when the outer annular body is in the cleaning position thereof, such that fluid introduced into the fluid chamber exits the fluid chamber in the direction of the optical lens. In this way, the fluid exiting the fluid chamber, for example in the form of a fluid jet, can be directed at the optical lens for cleaning the optical lens.

At least one fluid supply element, which opens into the fluid chamber and can include at least one fluid channel, is disposed on the inner annular body. The fluid supply element can be connected in a fluid-conducting manner to a pressure-generating device for generating a pressurized fluid, wherein the fluid can be gaseous or liquid.

The two annular bodies can be made of the same material or differing materials. Metal, plastic or a composite are possible materials, for example.

According to an advantageous embodiment, the outer annular body has a U-shaped cross-section and comprises two legs and one web connecting the legs to each other, wherein the radially inner leg is shorter than the radially outer leg. If the outer annular body is in the cleaning position thereof, this embodiment causes an annular gap to be formed between the inner annular body and the outer annular body, via which the fluid chamber is open with respect to the surroundings of the device and via which the optical lens, for optimal cleaning thereof, can be acted upon by a fluid from different directions. As an alternative, the radially inner leg of the outer annular body can be designed to be approximately or equally as long as the radially outer leg, wherein at least one, and preferably two or more outlet openings are provided on the radially inner leg, via which the fluid chamber is open with respect to the surroundings of the device when the outer annular body is in the cleaning position thereof, and via which the optical lens, for optimal cleaning thereof, can be acted upon by fluid from different directions.

According to a further advantageous embodiment, at least one nozzle, which can be connected in a fluid-conducting manner to the fluid supply element or a further fluid supply element, and which is configured to direct a fluid introduced into the nozzle at the optical lens when the outer annular body is in the cleaning position thereof, is disposed on the web and/or on the radially inner leg. For cleaning the optical lens, the nozzle can be acted upon by a fluid via the fluid supply element formed on the inner annular body, or via a separate further fluid supply element. In the first case, it may be provided that the pressure loss caused by the fluid exiting the fluid chamber via the at least one nozzle is so low compared to the pressure present in the fluid chamber that the outer annular body remains in the extended cleaning position thereof while the optical lens is being cleaned. In this embodiment, it is also possible for the fluid chamber to not be open with respect to the surroundings of the device when the outer annular body is in the extended cleaning position thereof, wherein the pressure present in the fluid chamber is essentially used to displace the outer annular body from the resting position thereof into the cleaning position thereof, or to correspondingly displace the nozzles disposed on the outer annular body, while the cleaning of the optical lens is carried out solely via the nozzles. The outer annular body is only returned back into this resting position by the restoring force acting thereon in the direction of the retracted resting position when the fluid chamber is no longer acted upon by a pressurized fluid. It is also possible for two or more nozzles to be distributed around the circumference of the web and/or the radially inner leg of the outer annular body.

A parking assistance system for a vehicle is also provided, comprising at least one parking assistance camera, which includes at least one optical lens and is disposed on the vehicle, characterized by at least one device according to one of the above-mentioned embodiments or any arbitrary combination of the same.

This parking assistance system accordingly has the advantages described above with respect to the device. The parking assistance system can also have a separate corresponding device for each optical lens.

According to an advantageous embodiment, the parking assistance system includes at least one pressure-generating device for generating a pressurized fluid, which is connected in a fluid-conducting manner to the fluid supply element disposed on the inner annular body. The pressure-generating device may be a pump for this purpose. The pressure-generating device can be configured to generate a pressurized gaseous fluid, such as compressed air, and/or a liquid fluid, such as water with or without an added cleaning agent.

According to a further advantageous embodiment, the parking assistance system includes at least one fluid reservoir for a gaseous or liquid fluid, which is connected in a fluid-conducting manner to the pressure-generating device.

A further advantageous embodiment provides for the pressure-generating device to be configured to first generate a pressurized liquid fluid, and thereafter a pressurized gaseous fluid. In this way, the optical lens can first be cleaned using the liquid fluid, and thereafter the optical lens can be dried by way of the gaseous fluid, such as compressed air, so as to remove the liquid fluid from the optical lens.

It is furthermore considered advantageous if the parking assistance system comprises at least one further pressure-generating device for generating a pressurized fluid, which is connected in a fluid-conducting manner to the nozzle disposed on the outer annular body. In this way, the fluid supply element of the inner annular body and the fluid chamber alone can be used to displace the outer annular body from the resting position thereof into the cleaning position thereof, whereas the nozzle is used to clean the optical lens.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
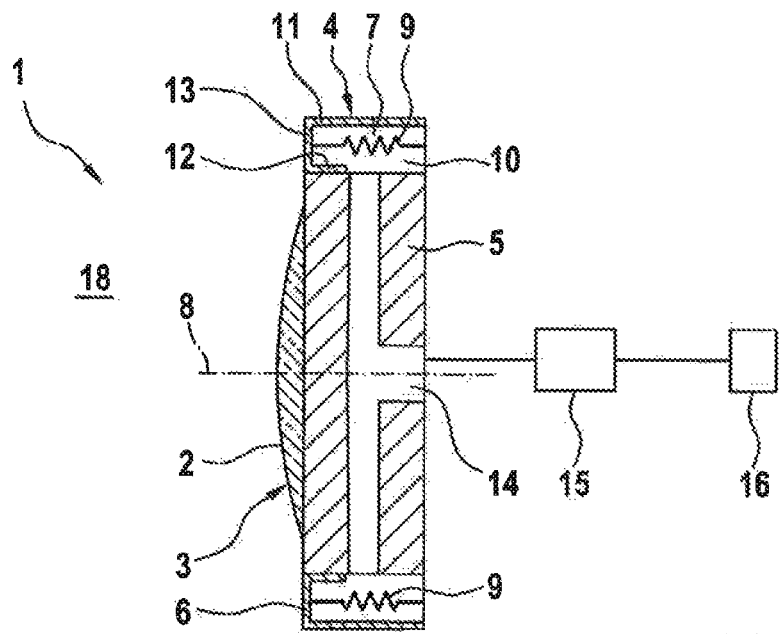
FIG. 1 is a schematic sectional illustration of one exemplary embodiment of a parking assistance system according to the invention in the resting state.

FIG. 1 shows a schematic sectional illustration of an exemplary embodiment of a parking assistance system 1 according to the invention for a vehicle in the resting state. The parking assistance system 1 includes a parking assistance camera 3, which includes an optical lens 2 and is disposed on the vehicle, and a device 4 for cleaning the optical lens 2.

The device 4 has an inner annular body 5, which is disposed on the optical lens 2 so as to be immovable and at least partially surround the optical lens 2 radially on the outside and on which an annular receptacle 7 is disposed, which is open toward the space in question 18 of the optical lens 2. The device 4 furthermore has an outer annular body 6, which is disposed coaxially to the inner annular body 5 with respect to the shared axis 8 and, in the shown resting position thereof, is disposed entirely within the receptacle 7.

Figure 2:
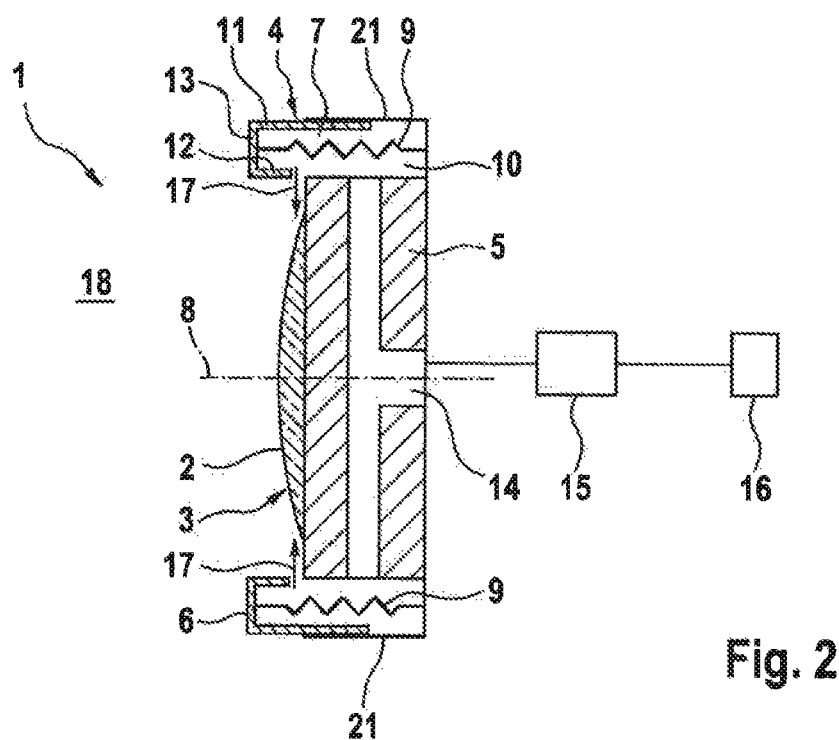
FIG. 2 is a schematic sectional illustration of the parking assistance system shown in FIG. 1 in the cleaning state.

The outer annular body 6 is disposed so as to be axially movable relative to the inner annular body 5 between the extended cleaning position, shown in FIG. 2, and the retracted resting position, shown in FIG. 1, wherein the outer annular body 6 is acted upon by a restoring force in the direction of the resting position thereof. The restoring force is generated by way of tension springs 9 in the embodiment shown.

An annular fluid chamber 10 is provided between the inner annular body 5 and the outer annular body 6. The outer annular body 6 has a U-shaped cross-section for this purpose. Moreover, the outer annular body 6 comprises two legs 11 and 12 as well as a web 13 connecting the legs 11 and 12 to each other, wherein the radially inner leg 12 is shorter than the radially outer leg 11. A branching fluid supply element 14 opening into the fluid chamber 10 is disposed on the inner annular body 5 and may have injection nozzles, which are not shown.

The outer annular body 6 is designed such that the fluid chamber 10 is closed with respect to the surroundings of the device 4 when the outer annular body 6 is in the resting position thereof. Furthermore, the outer annular body 6 is designed such that the fluid chamber 10 is open with respect to the surroundings of the device 4 when the outer annular body 6 is in the cleaning position thereof, such that a fluid introduced into the fluid chamber 10 exits the fluid chamber in the direction of the optical lens 2, as shown in FIG. 2.

The parking assistance system 1 furthermore includes a pressure-generating device 15 for generating a pressurized fluid, which is connected in a fluid-conducting manner to the fluid supply element 14 disposed on the inner annular body 5. The parking assistance system 1 moreover has a fluid reservoir 16 for a gaseous or liquid fluid, which is connected in a fluid-conducting manner to the pressure-generating device 15. The pressure-generating device 15 is configured to first generate a pressurized liquid fluid, and thereafter a pressurized gaseous fluid.

FIG. 2 is a schematic sectional illustration of the parking assistance system 1 shown in FIG. 1 in the cleaning state. The outer annular body 6 is in the cleaning position thereof, whereby the fluid chamber 10 is open with respect to the surroundings of the device 4 such that a fluid introduced into the fluid chamber 10 exits the fluid 10 chamber in the direction of the optical lens 2, as indicated by the arrows 17. In FIG. 2, a sealing arrangement with respect to the top and the bottom is schematically denoted by reference numeral 21 so as to be able to build the necessary backpressure.

Figure 3:
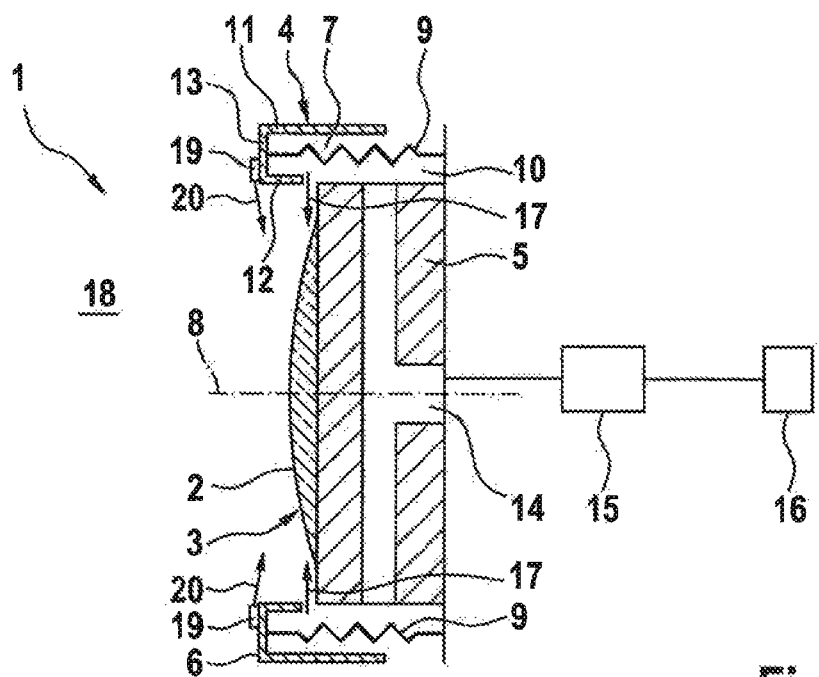
FIG. 3 is a schematic sectional illustration of a further exemplary embodiment of a parking assistance system according to the invention in the cleaning state.

The same applies, of course, analogously also to the exemplary embodiment according to FIG. 3, although this is not shown.

FIG. 3 shows a schematic sectional illustration of a further exemplary embodiment of a parking assistance system 1 according to the invention in the cleaning state. Contrary to the exemplary embodiment shown in FIGS. 1 and 2, nozzles 19 are disposed on the web 13, which are connected in a fluid-conducting manner to the fluid chamber 10, and thus to the fluid supply element 14. By means of the nozzles 19, a fluid can be conducted in the direction of the optical lens 2, as is indicated by the arrows 20.

Figure 4:
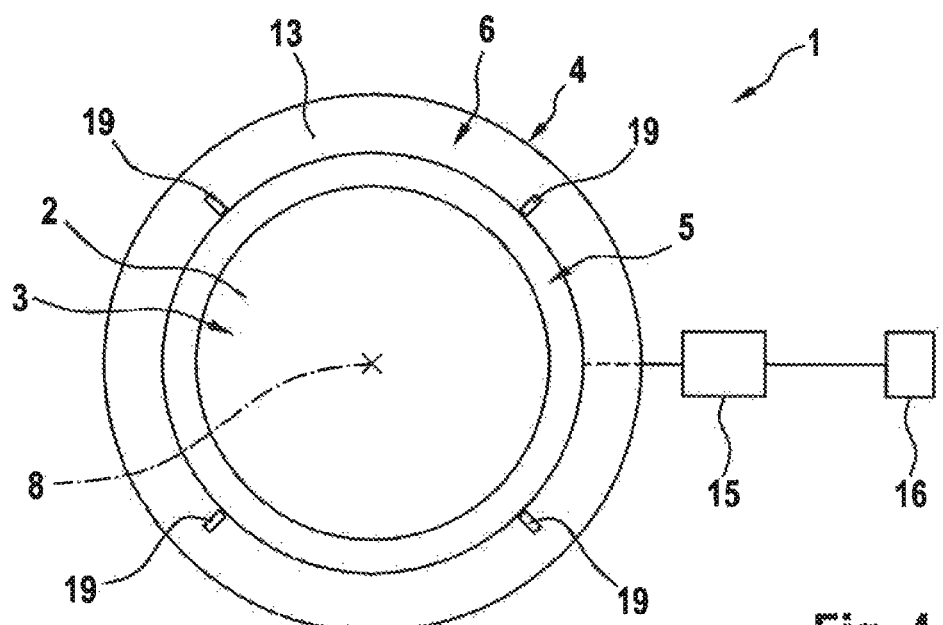
FIG. 4 is a schematic front view of the exemplary embodiment of a parking assistance system according to the invention shown in FIG. 3.

FIG. 4 shows a schematic front view of the exemplary embodiment of a parking assistance system 1 according to the invention shown in FIG. 3. The device 4 has four nozzles 19 distributed around the circumference.

LIST OF REFERENCE NUMERALS

1 parking assistance system
2 optical lens
3 parking assistance camera
4 device
5 inner annular body
6 outer annular body
7 receptacle
8 axis
9 tension spring
10 fluid chamber
11 radially outer leg
12 radially inner leg
13 web
14 fluid supply element
15 pressure generating device
16 fluid reservoir
17 arrow
18 space in question
19 nozzle
20 arrow The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A device for cleaning an optical lens of a parking assistance camera disposed on a vehicle, comprising:
at least one inner annular body, which is disposable on the optical lens so as to be immovable and at least partially surround the optical lens radially on an outside and on which an annular receptacle is formed, the annular receptacle being open toward a space of the optical lens; and
at least one outer annular body, which is disposed coaxially to the at least one inner annular body and at least partially within the annular receptacle, wherein
the at least one outer annular body is disposed so as to be axially movable relative to the at least one inner annular body between an extended cleaning position and a retracted resting position,
the at least one outer annular body is acted upon by a restoring force in the direction of the resting position thereof,
at least one fluid chamber is disposed between the at least one inner annular body and the at least one outer annular body,
the at least one outer annular body is configured such that the fluid chamber is closed with respect to surroundings of the device when the at least one outer annular body is in the resting position, the at least one outer annular body is configured such that the fluid chamber is open with respect to the surroundings of the device such that when said at least one outer annular body is in the cleaning position, a fluid introduced into the fluid chamber exits the fluid chamber in the direction of the optical lens, and at least one fluid supply element opening into the fluid chamber is disposed on the at least one inner annular body.

2. The device according to claim 1, wherein the at least one outer annular body has a U-shaped cross-section and comprises two legs and a web connecting the two legs to each other, a radially inner leg being shorter than a radially outer leg.

3. The device according to claim 2, further comprising: at least one nozzle, which is connectable in a fluid-conducting manner to the fluid supply element, or a further fluid supply element, and which is configured to direct a fluid introduced into the at least one nozzle at the optical lens when the at least one outer annular body is in the cleaning position thereof, the at least one nozzle being disposed on the web and/or on the radially inner leg.

4. A parking assistance system for a vehicle, comprising:
a parking assistance camera, which includes at least one optical lens and is disposed on the vehicle;
a device for cleaning the at least one optical lens, the device comprising:
at least one inner annular body, which is disposable on the at least one optical lens so as to be immovable and at least partially surround the at least one optical lens radially on an outside and on which an annular receptacle is disposed, which is open toward a space of the at least one optical lens; and
at least one outer annular body, which is disposed coaxially to the at least one inner annular body and at least partially within the annular receptacle, wherein
the at least one outer annular body is disposed so as to be axially movable relative to the at least one inner annular body between an extended cleaning position and a retracted resting position,
the at least one outer annular body is acted upon by a restoring force in the direction of the resting position thereof,
at least one fluid chamber is disposed between the at least one inner annular body and the at least one outer annular body,
the at least one outer annular body is configured such that the fluid chamber is closed with respect to surroundings of the device when the at least one outer annular body is in the resting position,
the at least one outer annular body is configured such that the fluid chamber is open with respect to the surroundings of the device such that when said at least one outer annular body is in the cleaning position, a fluid introduced into the fluid chamber exits the fluid chamber in the direction of the at least one optical lens, and
at least one fluid supply element opening into the fluid chamber is disposed on the at least one inner annular body.

5. The parking assistance system according to claim 4, further comprising:
at least one pressure-generating device that generates a pressurized fluid, the pressure-generating device being connected in a fluid-conducting manner to the fluid supply element disposed on the at least one inner annular body.

6. The parking assistance system according to claim 5, further comprising:
at least one fluid reservoir for a gaseous or liquid fluid, the at least one fluid reservoir being connected in a fluid-conducting manner to the at least one pressure-generating device.

7. The parking assistance system according to claim 5, wherein
the at least one pressure-generating device is configured to first generate a pressurized liquid fluid, and thereafter generate a pressurized gaseous fluid.

8. The parking assistance system according to claim 6, wherein
the at least one pressure-generating device is configured to first generate a pressurized liquid fluid, and thereafter generate a pressurized gaseous fluid.

9. The parking assistance system according to claim 5, further comprising:
a further pressure-generating device that generates a pressurized fluid, the further pressure-generating device being connected in a fluid-conducting manner to a nozzle disposed on the at least one outer annular body, wherein
the nozzle is configured to direct fluid introduced into the nozzle at the optical lens when the at least one outer annular body is in the cleaning position.

\* \* \* \* \*